US012730423B2

(12) United States Patent
Deng

(10) Patent No.: US 12,730,423 B2
(45) Date of Patent: Sep. 8, 2026

(54) METHOD AND DEVICE FOR PERFORMING AN OPERATION BASED ON SENSOR SIGNAL DATA

(71) Applicant: SIGNIFY HOLDING B.V., Eindhoven (NL)

(72) Inventor: Han Lin Deng, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 418 days.

(21) Appl. No.: 17/628,340

(22) PCT Filed: Jul. 6, 2020

(86) PCT No.: PCT/EP2020/068963
§ 371 (c)(1),
(2) Date: Jan. 19, 2022

(87) PCT Pub. No.: WO2021/013514
PCT Pub. Date: Jan. 28, 2021

(65) Prior Publication Data

US 2022/0404784 A1 Dec. 22, 2022

(30) Foreign Application Priority Data

Jul. 22, 2019 (WO) ................ PCT/CN2019/097154
Aug. 23, 2019 (EP) .................................... 19193236

(51) Int. Cl.
*G05B 19/042* (2006.01)
*G06K 9/00* (2022.01)
*H05B 47/19* (2020.01)

(52) U.S. Cl.
CPC ........ *G05B 19/042* (2013.01); *G06F 2218/08* (2023.01); *H05B 47/19* (2020.01)

(58) Field of Classification Search
CPC . G05B 19/042; G06F 2218/08; H05B 47/105; H05B 47/19; H05B 47/115; Y02B 20/40
See application file for complete search history.

(56) References Cited

U.S. PATENT DOCUMENTS 9,728,188 B1 * 8/2017 Rosen ..................... G10L 25/51
10,074,364 B1 * 9/2018 Wightman ............ G10L 15/285
(Continued)

FOREIGN PATENT DOCUMENTS

EP 3357420 A1 8/2018
EP 3367062 A1 8/2018
(Continued)

OTHER PUBLICATIONS

Yves de Montcheuil, "4 Strategies to Distribute Your Data Between Front End and Back End", https://www.infoworld.com, May 27, 2015, pp. 1-4.

*Primary Examiner* — Charles R Kasenge

(57) ABSTRACT

A method (10) of and a device (50) for performing an operation based on sensor signal data obtained from at least one sensor. From the sensor signal data, by a processor (54) of the device (50), a feature profile is generated that is matched (12) to a set of predetermined feature profiles. The operation is performed (13) by the device (50) based on the sensor signal data, if the generated feature profile matches at least one of the set of predetermined feature profiles, and the operation is performed (14) by the device (50) based on remote processing (40) of the sensor signal data (40) if the generated feature profile does not match at least one of the set of predetermined feature profiles. With the disclosed method, balance in processing power, processing time, and reliable operation by the device (50) is achieved without incurring extra cost for upgrading the device (50).

21 Claims, 7 Drawing Sheets

(56) References Cited

U.S. PATENT DOCUMENTS

| | | | | |
|---|---|---|---|---|
| 10,091,545 | B1 * | 10/2018 | Cwik | H04N 21/6547 |
| 11,523,485 | B1 * | 12/2022 | Fu | H04N 7/181 |
| 2015/0331666 | A1 * | 11/2015 | Bucsa | G06F 3/167 704/275 |
| 2017/0365149 | A1 | 12/2017 | Ten Kate | |
| 2018/0232637 | A1 | 8/2018 | Caicedo Fernandez et al. | |
| 2018/0237026 | A1 | 8/2018 | Chowdhury et al. | |
| 2018/0268674 | A1 * | 9/2018 | Siminoff | H04N 7/186 |
| 2018/0336920 | A1 * | 11/2018 | Bastian | G10L 15/22 |
| 2019/0045180 | A1 | 2/2019 | Caicedo Fernandez et al. | |
| 2019/0065868 | A1 | 2/2019 | Tran et al. | |
| 2019/0104017 | A1 * | 4/2019 | Khosrowpour | H04L 41/0813 |
| 2019/0137653 | A1 | 5/2019 | Starr et al. | |
| 2020/0152186 | A1 * | 5/2020 | Koh | G10L 15/08 |

FOREIGN PATENT DOCUMENTS

| | | | |
|---|---|---|---|
| GB | 2510836 | A | 8/2014 |
| WO | 2013055487 | A1 | 4/2013 |
| WO | 2017134091 | A1 | 8/2017 |
| WO | 2017182512 | A1 | 10/2017 |
| WO | 2019094567 | A1 | 5/2019 |

* cited by examiner

METHOD AND DEVICE FOR PERFORMING AN OPERATION BASED ON SENSOR SIGNAL DATA

CROSS-REFERENCE TO PRIOR APPLICATIONS

This application is the U.S. National Phase application under 35 U.S.C. § 371 of International Application No. PCT/EP2020/068963, filed on Jul. 6, 2020, which claims the benefits of European Patent Application No. 19193236.7, filed on Aug. 23, 2019 and International Patent Application No. PCT/CN2019/097154, filed on Jul. 22, 2019. These applications are hereby incorporated by reference herein.

TECHNICAL FIELD

The present disclosure generally relates to controlling operations by sensor-enabled devices and, in particular, to a processor controlled method of performing an operation based on sensor signal data, as well as a processor controlled device, system and computer program product.

BACKGROUND

Advancing developments in sensor technology allow more and more devices to perform automated operations adapted to particular events, based on sensor signal data obtained from one or more sensors arranged for providing at least one of, but not limited to, motion data, sound data, image data, video data, temperature data, humidity data, pressure data, luminance data, chemical composition or substance data, olfactive data and tactile data.

These sensors are generally arranged in, but may also externally connect to, a respective device. The sensor signal data obtained are generally processed by processing equipment, such as suitably programmed general purpose processors or application specific integrated circuits, comprised by the device.

As an example, motion detection sensors may be used to detect and measure acceleration forces and rotational forces, so as to detect moving objects, to perform an operation by a device in response to a particular type of motion. If the device is or comprises a lighting fixture, for example, the operation may comprise igniting lighting by the lighting fixture at the detection of a person approaching the device and avoiding lighting based on motion detected of a nearby waving tree, or the like.

As another example, so-called environmental sensors may be used to measure various environmental parameters, such as ambient air temperature and pressure, illumination, and humidity, for triggering an alert when processing of the thus obtained sensor signal data indicates an emergency situation, for example.

Using a number of different sensors in a single device for improving an intended and/or automated operation of the device at the occurrence of a particular event to be detected from sensor signal data, inevitable means that different types of raw sensor signal data are to be processed by the processing equipment of the device, which sensor signal data may be heterogeneous in nature and may comprise a fairly large amount of data to be processed when compared to a single type of sensor signal data.

Reliable detection of a moving person in a garden, in the presence of a number of trees and bushes, under rainy and windy conditions, provides a rather complex and elaborate data processing task, by the processing of data from motion sensors, humidity sensors, and temperature sensors, for example, compared to the detection of an intruder in a museum at night from sensor signal data of motion detection sensors only, for example.

In practice, many network and/or user devices or terminals equipped with sensors are of limited capacity in terms of hardware and software resources that are available and/or may be used to process collected sensor signal data.

An increase in both the amount of sensor signal data and the complexity in the processing thereof not only poses difficulties in the implementation thereof in presently available sensor-enabled devices, but may also significantly increase costs of future devices, for example.

Sensor signal data obtained may be communicated to a remote computing system, having computing devices comprising a larger amount of processing capacity and/or more sophisticated processing algorithms, such as desktop computers, workstations or network servers, compared to processing equipment embedded in a user or network device for processing the sensor signal data. However, such a solution is limited in its application due to several reasons.

Continuous exchange, by a device or terminal, of sensor signal data with a remote computing device requires relatively powerful signaling resources, results in increased power consumption by the device, and extensive usage of intermediate telecommunication networks, to which the device and the remote computing device need to be connected to.

Moreover, most operations performed by the devices have to be delivered in a timely, sometimes in a real-time or near to real-time manner, which is difficult and/or costly to achieve when a remote computing or processing device is involved in the processing of the sensed data. This makes it even more challenging to remotely process collected sensor signal data.

Accordingly, responsive, accurate and timely processing of sensor signal data by a sensor enabled device, based on an increased amount of (heterogeneous) sensor signal data, for reliably detecting a particular event for performing an intended operation or operations by the device, against efficient use and deployment of processing resources in the device, becomes a challenging objective in existing and new processor controlled devices.

SUMMARY

The above mentioned objective and others are achieved, in a first aspect of the present disclosure, by a method of performing an operation based on sensor signal data obtained from at least one sensor by a device comprising a processor, which method comprises the steps of:

- generating, by the processor, a feature profile from the sensor signal data;
- matching, by the processor, the generated feature profile to a set of predetermined feature profiles available to the processor;
- performing the operation, by the device, controlled by the processor, based on the sensor signal data, if the generated feature profile matches at least one of the set of predetermined feature profiles, and
- performing the operation, by the device, controlled by the processor, based on remote processing of the sensor signal data, if the generated feature profile does not match at least one of the set of predetermined feature profiles.

The present disclosure is based on a hybrid manner of processing available sensor signal data, comprising a local sensor signal data evaluation mode and a remote sensor signal data evaluation mode. Performing an operation by the device based on a respective sensor signal data evaluation mode depends on whether a particular event can be reliably determined or detected by the processing resources locally available at the device.

To this end, in a first step, from sensor signal data obtained by one or more sensors, the processor of the device generates a so-called feature profile. For the purpose of the present application, a feature is a distinctive technical characteristic or parameter representing useful and dominant information comprised by or hidden in the sensor signal. A feature profile comprises at least one feature. However, in practice, a feature profile will comprise several features and/or relations between features. Features may be obtained by processing the sensor signal data in accordance with a particular feature processing algorithm available to the processor.

In a next step, the thus generated feature profile is matched to a set of predetermined feature profiles locally available to the processor. These predetermined feature profiles each represent information that can be reliably detected from the sensor signal data by the processing resources, i.e. the processor and a feature processing algorithm, locally available at the device.

In case of a match, that is when the generated feature profile corresponds one-to-one or to a certain extent to at least one feature profile of the set of predetermined feature profiles, an intended operation or operations are performed by the device based on a the sensor signal data, under the control of the processor.

However, if the generated feature profile does not match any feature profile of the set of predetermined feature profiles, operation of the device then depends on the result of a remote processing of the sensor signal data. That is, sensor signal data obtained are communicated to a remote computing system, having computing devices comprising a larger amount of processing capacity and/or more sophisticated feature processing algorithms, such as desktop computers, workstations or network servers, compared to the processing resources locally available to the device.

With the present solution, the obtained sensor signal data are subjected to an evaluation of the complexity or difficulty level thereof, also called adversary evaluation, for reliably detecting or determining an event sensed by the at least one sensor.

As a rule, a particular operation by the device is performed based on the evaluation results calculated by the processing resources locally available at or in the device, unless local processing results show that the local available processing resources are insufficient for determining whether to perform an intended operation.

That is, in the case that the generated feature profile matches the set of predetermined feature profiles, the sensor signal data are considered as being relatively easy to evaluate by the limited or scarce processing resources locally available to the device, i.e. qualified as easy adversary, and the device may perform the operation directly based on the sensor signal data.

Otherwise, if there is no match between the generated feature profile and the set of predetermined feature profiles, the evaluation of the sensor signal data is considered difficult and complex, i.e. qualified as difficult adversary. In that case, the limited processing resources locally available to the device are considered insufficient for evaluation of the sensor signal data, such that processing of the sensor signal data by more powerful processing resources remote from the device is required.

It can be contemplated that the sensor enabled device will be designed such that the majority of operations and tasks to be performed by the device, like day to day regular and routine operations, should be processed and controlled based on the processing resources locally available with the device. Only in special circumstances, i.e. events resulting in more complicated and extensive sensed data, the computing capacity of powerful backend devices for processing the sensor signal data is to be used.

In this way, an operation by the device is performed in a balanced manner in terms of processing and data transmission efficiency, operation accuracy, costs and responsiveness.

In an embodiment of the present disclosure, the generating step comprises generating the feature profile by using a predefined data analysis algorithm including one of a transformation algorithm and a feature extraction algorithm, including statistical data analysis algorithms.

Features or dominant information that directly correspond to a sensed quantity by a respective sensor, such as measured maximum temperature, mean and standard deviation in measured temperatures or the like, can be advantageously processed and evaluated using a respective feature extraction algorithm. Evaluation of information that is hidden in the sensor signal data may require the use of data transformation algorithm, such as transformation of the sensor signal data from the time domain into the frequency domain, for example. For the purpose of the present disclosure different feature extraction and/or known data transformation algorithms may be applied.

Accordingly, a feature profile in accordance with the present disclosure may rely on various features directly extracted from the sensor signal data, or features available in a transformed version of the sensor signal data, such as features available in a domain different from the domain in which the sensor signal data are sensed.

As described above, adversary evaluation of the sensor signal data is performed by the limited or scarce processing resources located at or in the sensor enabled device. However, with limited local computation and storage resources, running transformation algorithms requiring a rather high computation effort is not feasible.

To achieve an optimal balance between satisfaction in performance and economy in resources, in accordance with another embodiment of the present disclosure, a Fast Fourier Transform, FFT, feature processing algorithm is applied by the local processor of the device, wherein the generated feature profile is a frequency or spectrum feature profile comprising a set of frequency components having an amplitude exceeding a predetermined threshold value, and wherein the set of predetermined feature profiles comprises spectrum feature profiles defined by a number and frequency of frequency components exceeding the threshold.

In terms of computing resource requirements, both in terms of processing and storage capacity, FFT qualifies as a relatively simple data structure, representing useful physical information for evaluating the obtained sensor signal data and discovering predetermined events.

In accordance with an embodiment of the present disclosure, in the matching step the generated feature profile is compared to a set of predetermined feature profiles available to the processor.

Comparing profiles is a relative straightforward form of matching, not requiring extensive processing capacity, and hence suitable for being applied by limited processing resources. The set of predetermined feature profiles may be obtained, for example, from a number of tests performed on a set of historical sensor signal data relating to a particular event or events whether or not for which an intended operation by a sensor enabled device is to be performed.

The predetermined feature profiles may distinguish between profiles relating to targeted events for which an operation is to be performed by the device, and background events, not representing events for which an operation is to be performed by the device.

A feature profile may rely on various features, either features directly extracted from the sensor signal data and/or features available in a transformed version of the sensor data in a different domain. Hence, comparing feature profiles may involve comparing various features of the generated feature profile to corresponding features of each feature profile in the set of predetermined feature profiles.

A match can be decided upon when the generated feature profile corresponds one-to-one or to a certain extent to at least one feature profile of the set of predetermined feature profiles.

The matching step may adopt different standards for different features. For example, matching in the frequency domain may be qualified to be positive when the frequency components in both the generated and predetermined spectrum feature profile are at an identical frequency value, while matching between amplitudes is qualified as being positive when one amplitude is above or within a certain range or percentage of another amplitude.

In order to support deciding upon a match of feature profiles, in a further embodiment of the present disclosure the matching step comprises determining whether a generated feature profile repeats in a predetermined time period.

For example, a generated feature profile for which an operation by the sensor enabled device is to be performed, i.e. a match, but that repeats for a period of time extending beyond the time duration of a respective event, may eventually not be decided as being a positive match.

With this additional criterion, targeted events can be even more reliably differentiated from background events, for example.

In the present disclosure, to save as much as possible scarce or limited processing resources at the sensor enabled device, it is advantageous to perform a particular operation, by the device, directly based on the outcome or result of the matching step. That is in accordance with a matching feature profile in case of a positive match. In that case, the predetermined feature profiles directly correspond to a particular event or events upon occurrence of which the device needs to perform a particular operation.

If the generated feature profile does not match the set of predetermined feature profile, two different scenarios may be distinguished.

In a first scenario, the raw sensor signal data are remotely pre-processed and further evaluated by the local processor of the device for detecting or determining a particular event for performing an operation by the device, by generating a feature profile from the pre-processed and matching same to the set of predetermined feature profiles, as disclosed above.

In a second scenario, the remote processing of the sensor signal data may directly result in the detection of the possible occurrence of a particular event for performing an operation of the device.

In both scenarios, the intended operation or operations are performed by the device under control of the processor.

In an embodiment of the present disclosure, the step of performing the operation, by the device, using the sensor signal data further comprises applying an operation algorithm to the sensor signal data.

A relative simple example of an operation algorithm is to measure the humidity level in a room or space conditioned by an air conditioner, for making appropriate settings at the air conditioner, prior to starting operation thereof triggered by the event of the room temperature being above a set level and determined from a feature profile based on room temperature measurements, for example.

It is noted that the operation algorithm may operate on more or other sensor signal data than used for the matching step, or the other way around, for example. To save scarce resources, the operation algorithm and data analysis algorithm for generating a feature profile may be combined into a single data processing algorithm.

For operating in the remote or external sensor signal data evaluation mode, when the sensor signal data are qualified as difficult adversary, prior to performing the operation of the device based on remote processing of sensor signal data, a transceiver of the device performs the steps of:

transmitting the sensor signal data to the remote computing device, and receiving, from the remote computing device, processed sensor signal data obtained by applying at least one processing algorithm at the transmitted sensor signal data by the remote computing device.

The step of receiving processed sensor signal data, for the purpose of the present disclosure, comprises receiving processed or pre-processed sensor signal data and/or receiving the result or results from the remote processing of the sensor signal data.

The at least one processing algorithm applied by the remote computing device may be more sophisticated compared to the operation algorithm applied by the processor of the device itself. A more sophisticated algorithm will outperform a simple algorithm in processing complex sensor signal data, such as obtained under strong noisy conditions or subject to interferences. Moreover, multiple sophisticated operation algorithms may be used to process the complex sensor signal data, and a final result may be based on a vote, such as a majority vote, from the several algorithms.

The method therefore allows sensor signal data that are complicated due to various reasons, such as hybrid data obtained from multiple mutually different sensors, and/or irregular data obtained under extreme atmospheric or weather conditions, to be processed remotely as to produce a more reliable result, by taking advantage of the stronger processing capacity which is not available to the device itself.

Transmitting or communicating the sensor signal data by the transceiver may depend on the available communication resources of the transceiver. Accordingly, in an embodiment of the present disclosure transmitting the sensor signal data by the transceiver comprises transmitting a representation of the sensor signal data to the remote computing device.

That is, all the raw sensor signal data or data samples obtained in a certain time window may be transmitted to the remote or backend computing device, in particular if there is no limitation on data transmission rate.

However, the raw sensor data samples may be downsampled by the processor locally available in the device, to form new data samples, representing the raw sensor signal data, such that the transmission of these new data samples will not exceed the limitation on data transmission rate. On receiving the new data samples, the remote or backend computing device/devices needs/need to reconstruct the original data samples by classical signal reconstruction techniques, for example.

In case the capacity of the processor of the device allows computation of data compression, the raw data samples are compressed to form new data samples, representing the raw sensor signal data, such that the transmission of the new data samples will not exceed the limitation on needs to reconstruct the original data samples by classical data decompression techniques, for example.

The method of the present disclosure may be used to operate a device or to perform an operation or operations by a sensor enabled device based on at least one of, but not limited to, sensor signal data comprising at least one of motion data, sound data, image data, video data, temperature data, humidity data, pressure data, luminance data, chemical composition or substance data, olfactive data and tactile data. Depending on the sensors and the data available from the sensors, different operations may be performed by the device.

In a specific embodiment of the present disclosure, the device comprises a lighting fixture comprising at least one lighting module, in particular a Light Emitting Diode, LED, lighting module and wherein performing the operation, by the device, comprises controlling lighting by the at least one lighting module.

The lighting fixture may have different sensors connected thereto or even integrated therewith, which sensors may measure various conditions or parameters, such as ambient sound, movement, temperature, luminescence and so on. The lighting by the lighting device may be controlled based on the measured sensor data whether or not applying an operation algorithm, as explained above.

In a second aspect of the present disclosure, there is provided a device for performing an operation based on sensor signal data obtained from at least one sensor, the device comprising a processor and a transceiver, wherein the processor and transceiver are arranged for performing the operation, controlled by the processor, in accordance with the method of the first aspect of the present disclosure described above.

The device may comprise at least one sensor arranged for providing at least one of motion data, sound data, image data, video data, temperature data, humidity data, pressure data, luminance data, chemical composition or substance data, olfactive data and tactile data.

In a specific embodiment of the present disclosure, the device comprises at least one lighting module, in particular a Light Emitting Diode, LED, wherein performing the operation by the device, controlled by the processor, comprises controlling lighting by the at least one lighting module.

Controlling lighting by the lighting module may involve changing or setting the light intensity, the color, the geographical direction of the emitted light, a particular operating mode such as flashing, etc.

Those skilled in the art will appreciate that the device may also comprise a camera or camera's, acoustic alarms, etc. to be operated based on the sensor signal data obtained.

In a third aspect of the present disclosure, there is provided a system, comprising a device according to the second aspect of the present disclosure and a remote or backend computing device, wherein the remote backend computing device in accordance with the first aspect of the present disclosure is arranged for:

receiving sensor signal data from the device, i.e. the sensor enabled device;

pre-processing received sensor signal data by applying at least one pre-processing algorithm, and transmitting the pre-processed sensor signal data to the device.

In a fourth aspect of the present disclosure, there is provided a computer program product comprising program code stored on a computer readable medium, the program code arranged for performing the method described in the first aspect of the present disclosure, when the program code is executed by at least one processor.

The above and other aspects of the present disclosure will be apparent from and elucidated with reference to the non-limitative example embodiment(s) described hereinafter.

DETAILED DESCRIPTION

The present disclosure is detailed below with reference to a method of performing an operation by a motion detection device, that is a device obtaining motion sensor signal data, as well as a motion detection device and a system comprising a motion detection device and a remote or backend computing device. Those skilled in the art will appreciate that the present disclosure is not limited to operation based on motion detection sensor signal data, but is equally applicable for operation by a wide variety of sensor enabled devices, as indicated in the summary part.

Throughout the present description, the terms “sensor signal data”, “sensor data”, and “signal” are used interchangeably.

A typical mainstream motion detection device currently comprises one or more microwave motion detection sensors and a Microcontroller Unit, MCU, data processing unit, merged into a single motion detection device. The sensors are arranged to collect raw sensor signal data by sensing motion in the environment surrounding the device. The raw data is collected, either wired or wirelessly, for being processed and evaluated by one or more data processing algorithms running on the MCU, to thereby determining or discovering a detection result or event, for performing an intended operation by the device. It is expected that a qualitatively good motion detection device, for example for outdoor use, will produce correct detection results and that any operation to be performed in response to the detection of motion is not negatively impacted even under unfavorable or extreme conditions, such as rainy weather and/or in the presence of interferences or noise caused by moving objects due to the wind, for example.

Figure 1:
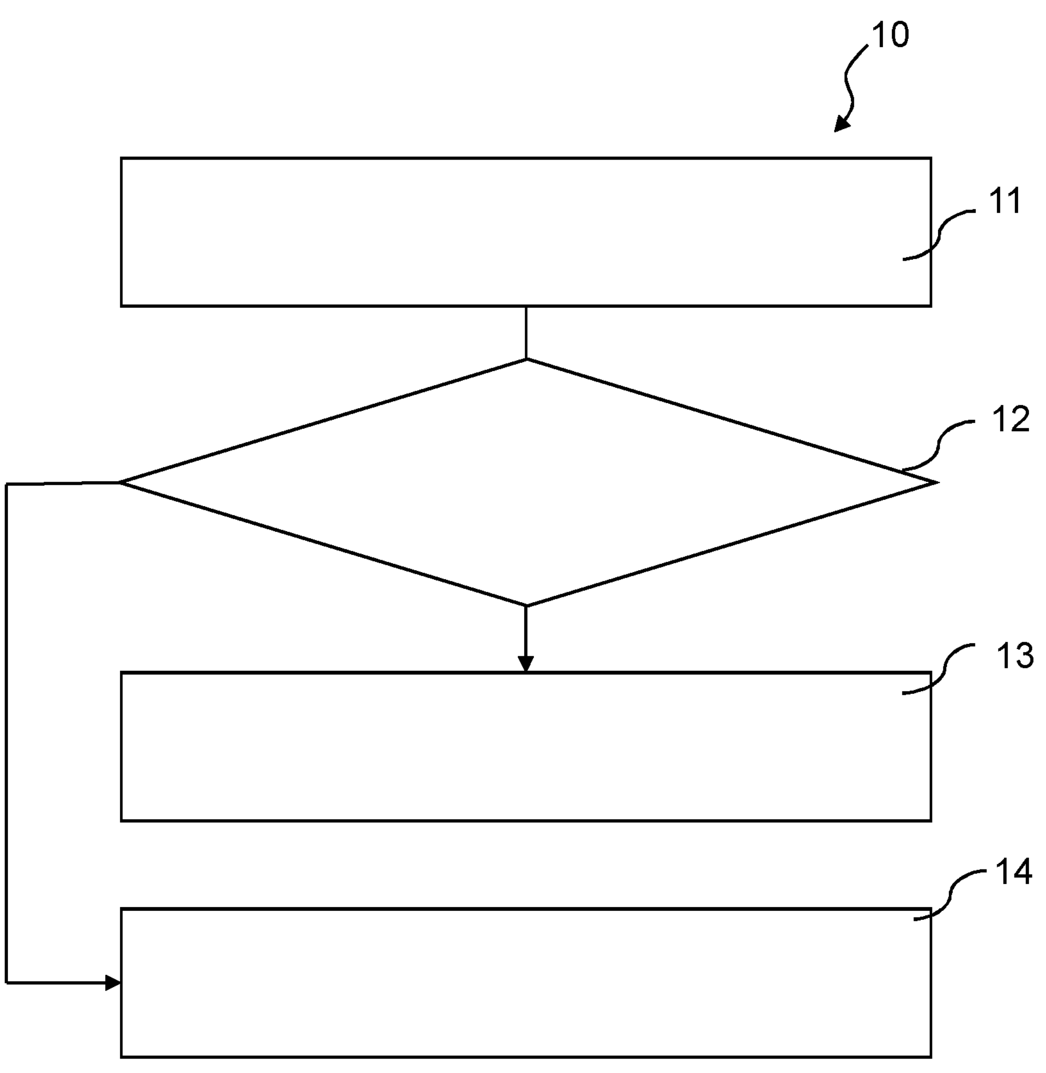
FIG. 1 illustrates, in a flow chart type diagram, a method of performing an operation by a device based on sensor signal data obtained from at least one sensor, in accordance with the present disclosure.

FIG. 1 illustrates, in a flow chart type diagram, a method 10 of performing an operation by a device, such as a motion detection device, based on sensor signal data obtained from at least one sensor, such as a motion sensor, in accordance with the present disclosure.

At step 11, "Generating feature profile from sensor signal data", a processor of the device, such as an MCU or microprocessor, generates a feature profile from the sensor signal data collected from the at least one sensor.

The feature profile is generated using a predefined data analysis algorithm, such as a statistical feature extraction algorithm or a sensor signal data transformation algorithm that transforms the sensor signal data from one domain to another domain, such as from the time domain to the frequency or spectrum domain, for example.

A Fast Fourier Transform, FFT, algorithm may be considered as a premier choice for generating a spectrum feature profile from motion detection sensor signal data, achieving an optimal balance between performance and economy in processing resources, that may be scarce or limited in the end device.

An FFT spectrum provides a clear physical meaning for understanding relationships between events to be detected and the sensor signal data. The relatively simple data structure of an FFT is also suitable for computation in subsequent processing to be performed by the processor, such as in a classification algorithm and operation algorithm, for further processing of the sensor signal data.

Figure 2:
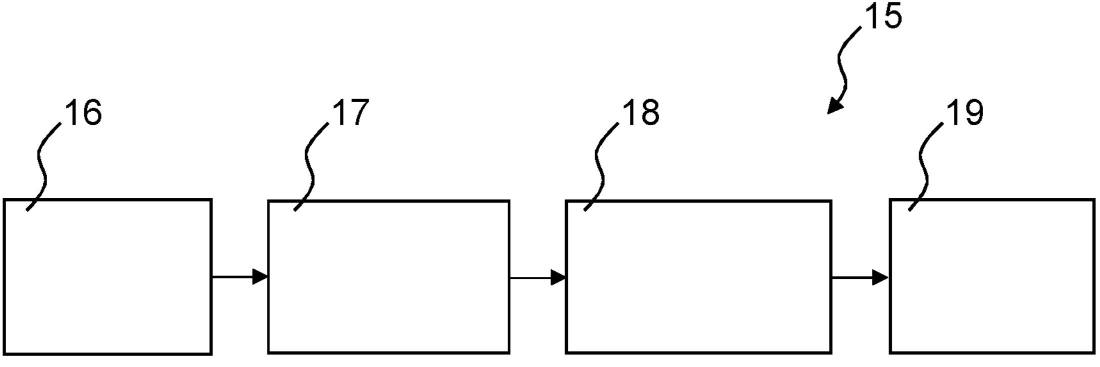
FIG. 2 illustrates, in a schematic diagram, steps of a Fast Fourier Transform, FFT, sensor signal data processing algorithm for generating a spectrum feature profile, in accordance with an embodiment of the present disclosure.

Spectrum generation using FFT is generally known to the person skilled in the art and schematically illustrated in FIG. 2. The FFT algorithm 15 includes slicing sensor signal data into a frame with fixed length 16, removing an offset or DC component from the frame data 17, applying or adding a window function on the data frame 18, and then performing FFT on the data frame 19. Moreover, in signal processing or statistics, a window function may be used to mitigate the spectral leakage effect. The window function may comprise one of a rectangular window, a Hamming window, a Parzen window, a Blackman window, etc.

The steps 16-19 are repeated for a new sample or collection of sensor signal data.

Returning to FIG. 1, following the generation of the feature profile, in step 12, "Generated feature profile matching predetermined feature profiles?", it is the processor of the device checks whether or not the generated feature profile matches a set of predetermined feature profiles locally available to the processor.

This step performs a so called adversary evaluation or difficulty evaluation of the sensor data, for establishing a degree of difficulty for the algorithm running on the MCU to provide a correct detection result or event by processing the sensor signal data, such as detection of a person moving at night in a garden in rainy weather. If the processing resources of the device are sufficient to provide a correct output, there is an easy adversary, otherwise there is a difficult adversary. For this purpose, the generated feature profile is matched to the set of predetermined feature profiles.

This set of predetermined feature profiles represents information or parameters that can be reliably detected from the sensor signal data obtained, by the processor of the device, using the spectrum feature processing algorithm, i.e. the FFT operation 15, locally available to the processor, i.e. that the processor is able to run.

The set of predetermined spectrum feature profiles may be obtained by analyzing historical sensor data, to conclude at differences between background features/spectra and target features/spectra.

For a motion detection sensor, mainly one may distinguish two types of events. That is, the motion event or events to be targeted, and a background event or events. A motion or target event is an event or occurrence where the sensor signal data carry distinguishable information or features for detecting a respective moving object, for example. A background event or occurrence is characterized by features not concluding at a moving object to be detected, for example information that is continuously present in subsequent sensor signal data samples or data frames.

Those skilled in the art will appreciate that the detection effort for detecting or determining a background event referring to a steady state or pseudo steady state situation may differ from the detection effort required for detecting or determining a target event from the sensor signal data, depending on whether features typically indicative of a target event will become distinguishably available from analyzing or evaluating the sensor signal data.

Figure 3A:
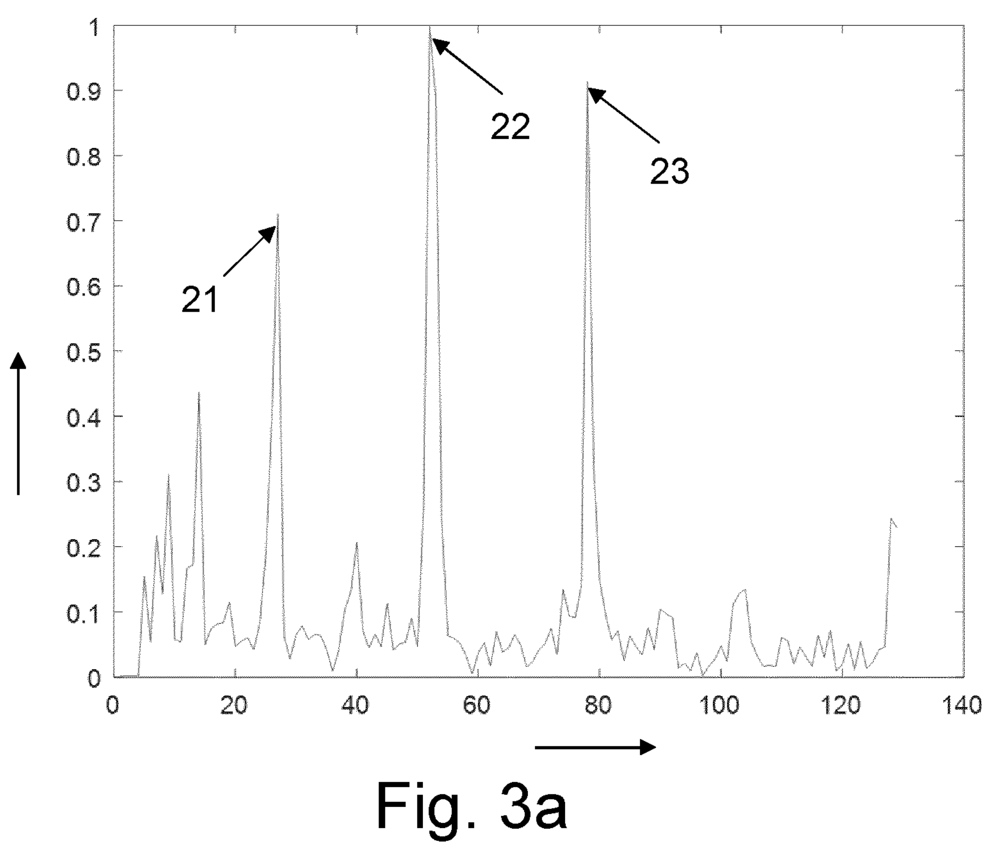
FIGS. 3*a* and 3*b* illustrate two typical easy adversaries in motion detection obtained from a spectrum feature profile generated by FFT applied on motion sensor signal data, in accordance with an embodiment of the present disclosure.
Figure 3B:
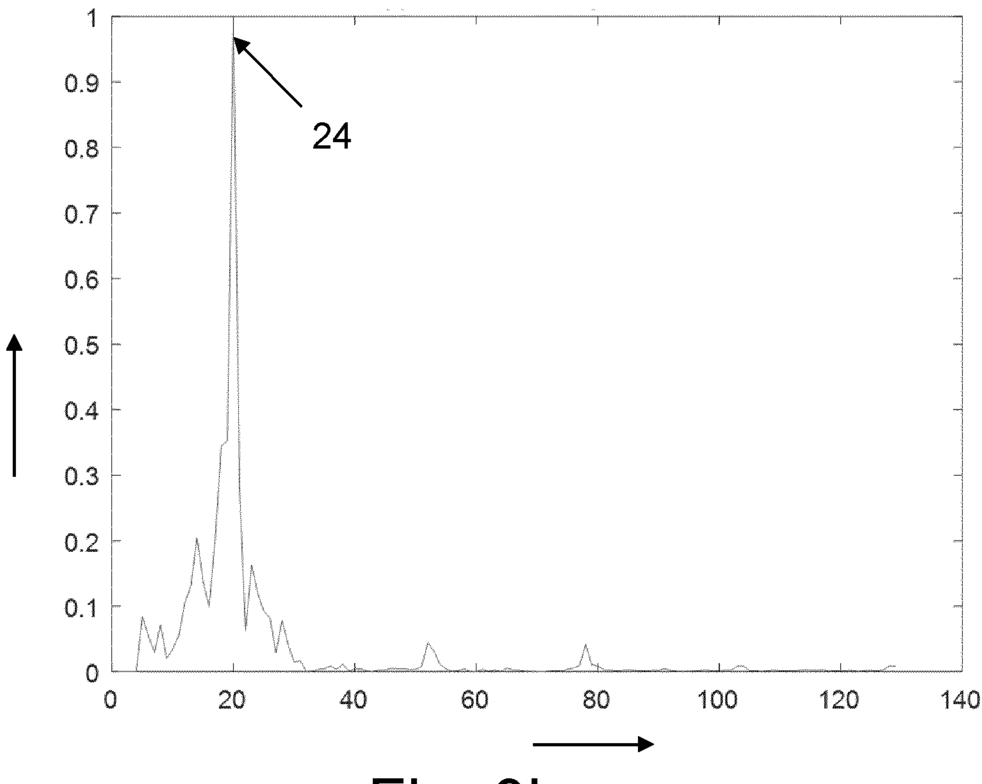

An example of two typical easy adversaries in motion detection, using FFT as a feature analysis algorithm, are graphically illustrated in FIGS. 3*a* and 3*b*, respectively. In FIGS. 3*a* and 3*b*, as well as in FIGS. 4*a*, 4*b*, and 4*c* the horizontal axis represents frequency in Hz and the vertical axis represents a normalized amplitude value or magnitude of the spectrum components.

FIG. 3*a* is a typical background spectrum feature profile generated by performing FFT on sensor signal data collected over a particular time period, and FIG. 3*b* is a typical motion spectrum feature profile generated from the sensor signal data, representing a target event, i.e. a moving object to be detected.

In the exemplary background spectrum of FIG. 3*a*, the spectrum comprises three frequency components 21, 22 and 23, hereafter referred to as peaks, each having a magnitude dominantly higher than other spectrum components. The peaks are located in a frequency range of about 25 Hz-80 Hz, comprising so called background frequency bins of the background spectrum around 25 Hz, 55 Hz and 80 Hz. In contrast, in the motion spectrum of FIG. 3*b*, there is only one dominant peak 24 at a frequency of about 20 Hz, whose magnitude is overwhelming, i.e. significantly exceeds beyond the magnitude of the other spectrum components. The peak 24 is located outside these background frequency bins.

Any feature profile, generated from sensor signal data, matching any of predetermined feature profiles comprised by the two spectrums as illustrated in FIGS. 3*a* and 3*b*, for example predetermined feature profiles comprising a total number of three peaks around 25 Hz, 55 Hz or 80 Hz, respectively, for deducing at a background event, and a peak around 20 Hz to determine a target event, is relatively easy to process for discriminating a target motion event.

Figure 4A:
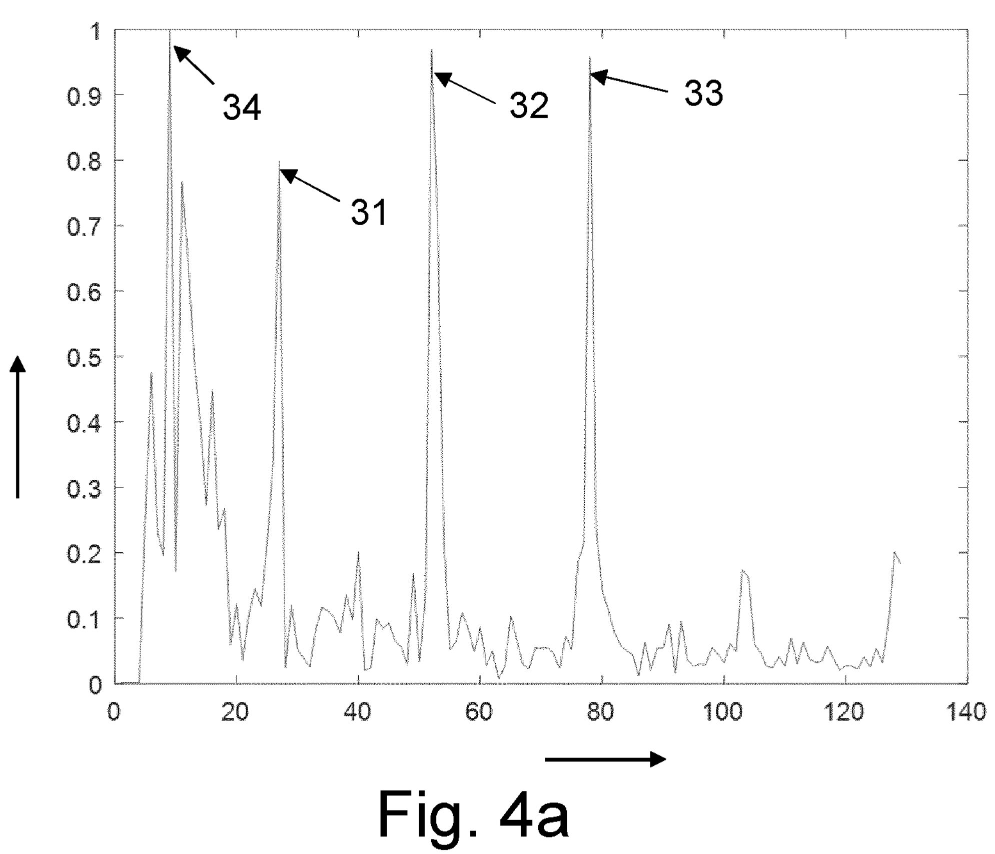
FIGS. 4*a*, 4*b* and 4*c* illustrate three difficult adversaries in motion detection obtained from a spectrum feature profile generated by FFT applied on motion sensor signal data, in accordance with an embodiment of the present disclosure.
Figure 4B:
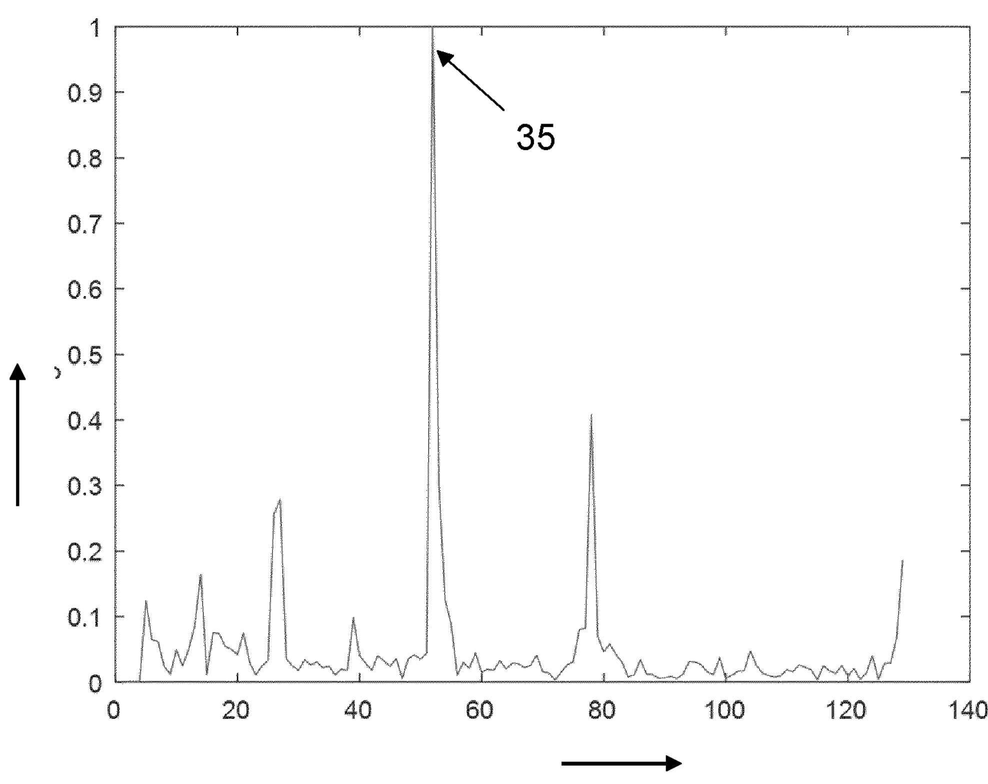
Figure 4C:
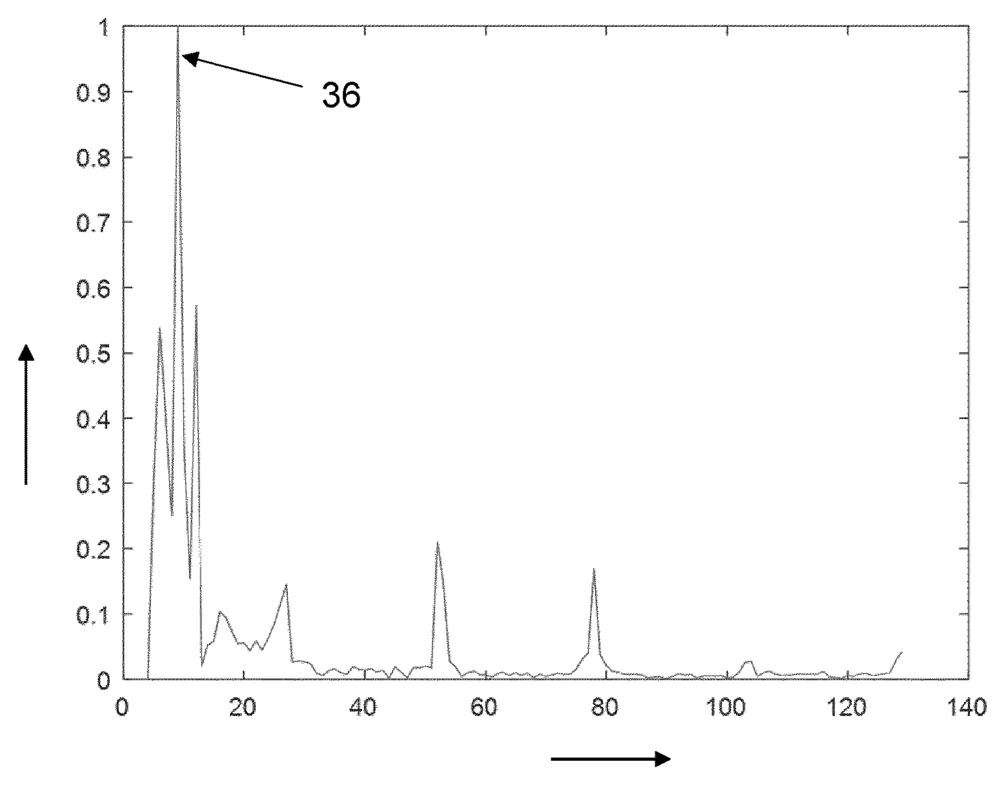

However, there may occur spectrums/feature profiles from which it is more difficult do decide whether there is a target event present or not. FIGS. 4*a*, 4*b* and 4*c* represent examples of three difficult adversaries.

In the motion spectrum feature profile shown in FIG. 4*a*, there are three dominant peaks 31, 32 and 33 with a similar magnitude relation on the background frequency bin compared to the background spectrum feature profile of FIG. 2*a*, but there is also another dominant peak 34 at around 10 Hz, which is beyond the background frequency bins, and whose peak magnitude is not overwhelming, i.e. not largely exceeds the other spectrum components in the spectrum, compared to the spectrum feature profile of FIG. 2*b*.

The ground truth results of many tests show that it is difficult to indicate whether the spectrum of FIG. 4*a* represents a target event or not. It is shown that the ratio between a background event and a motion or target event being represented by such a spectrum is about 4:6. Therefore, matching the feature profile of FIG. 4*a* using the feature profiles of FIGS. 3*a* and 3*b* as a set of predetermined feature profiles, will not easily give a correct or reliable output.

The spectrum feature profile shown in FIG. 4*b* has only one dominant peak 35 whose magnitude is overwhelming, but is located on one of the background frequency bins, i.e. around 55 Hz. The ground truth results of many tests show that the ratio between the background event and target or motion event with such spectrum is about 5:5. From the Doppler effect, it is possible that a particular motion speed triggers the peak around 55 Hz, which coincides with one of the background frequency bins of FIG. 3*a*. Accordingly, it is highly possible to get a wrong result if the algorithm, in the matching step, outputs a background event when meeting this spectrum.

Another type of frequency profile spectrum representing difficult adversary from motion sensor data is shown in FIG. 4*c*. The test was done under bad weather conditions, i.e. heavy wind and raindrops adding a severe interference into the raw sensor data. In this case, there is only one dominant peak 36 at about 10 Hz whose magnitude is overwhelming, i.e. the value of which significantly extends beyond the values of other spectrum components, and this peak is not in the neighborhood of any background frequency bin.

Matching this feature using the predetermined feature profiles deducted from FIGS. 3*a* and 3*b* will very likely result in a wrong output, i.e. a possible target event, because peak 36 is not located in a background event bin. In fact, the ground truth results of the tests show that this spectrum is just background spectrum from heavy rain weather. However, it still might be possible to correct the algorithm output since a continued appearance of the feature profile of FIG. 4*c* may result in detecting an event whose duration is abnormally long, for example, ranging from several minutes to several hours, which is most likely not a motion target event, such as a burglar or a person passing a lamppost, for example.

From the above examples it can be contemplated that the predetermined set of feature profiles, for example comprising the spectrums as illustrated in FIGS. 3*a* and 3*b*, or any other profile that is shown, may be used in a relative simple evaluation algorithm. Such as a matching step wherein the number, location or frequency of peaks of a generated FFT spectrum feature profile are compared to the number, location or frequency, i.e. frequency bins, of peaks of predetermined spectrum feature profiles available to and using processing resources locally present at a device, for determining a target event.

Referring back to FIG. 1, if step 12 determines that the generated feature profile matches the set of predetermined feature profiles, i.e. result "Y", an operation is performed by the device at step 13, "Performing operation using sensor signal data". For example, switching on a safety lighting or lamppost based on the detection of a moving person. It is noted that in the context of the present description and the claims, not switching on the safety lighting or lamppost is also regarded an operation to be performed by the device.

Thus the processing or evaluation resulting in a feature profile of the sensor signal data is at first done locally with the device, such as by applying a relatively simple algorithm which runs on a MCU. The algorithm targets at detecting an event by light weight computation and simple logic analysis. Such kind of algorithm may be designed based on empirical study on the relationship between the ground truth event and corresponding data features, as illustrated above.

From the examples above, with the FFT spectrum generated as a representing a spectrum feature profile, the number of spectrum components having a dominant value, i.e. the number of peaks, the frequency bins of peaks, and optionally the mutual relative magnitude of dominant peaks, may be used as a classification rule to compare each feature of a generated profile with a corresponding threshold, and making a final decision by combining all the comparison results. Afterwards operation is performed by the device based on the final decision.

However, when the result of step 12 in FIG. 1 is negative, result "N" of step 12, at step 14, "Performing operation using remotely pre-processed sensor data", the sensor data are first processed at a computing device remote from the end device because, from the examples above, processing the sensor data locally might be a challenging task for the device, as more processing power is required for making a correct interpretation of the sensor signal data than locally available to an end device. After that, the operation is performed by the device relying on the sensor data processed by the remote computing device.

The remote computing device may be a backend machine having a higher computation capacity, speed and larger storage space compared to local device processor. It is possible to run extensive algorithms on the backend machine to give a more trustful evaluation output than possible by the simple algorithm running on an the MCU.

It can be understood that it is difficult for any single algorithm to outperform other algorithms on all problems. Strong algorithms running on the remote backend machine mainly provide two functions. One is generating diverse and complementary features with large number of data samples, the other is using multiple sophisticated classification algorithms to vote the final decision.

Figure 5:
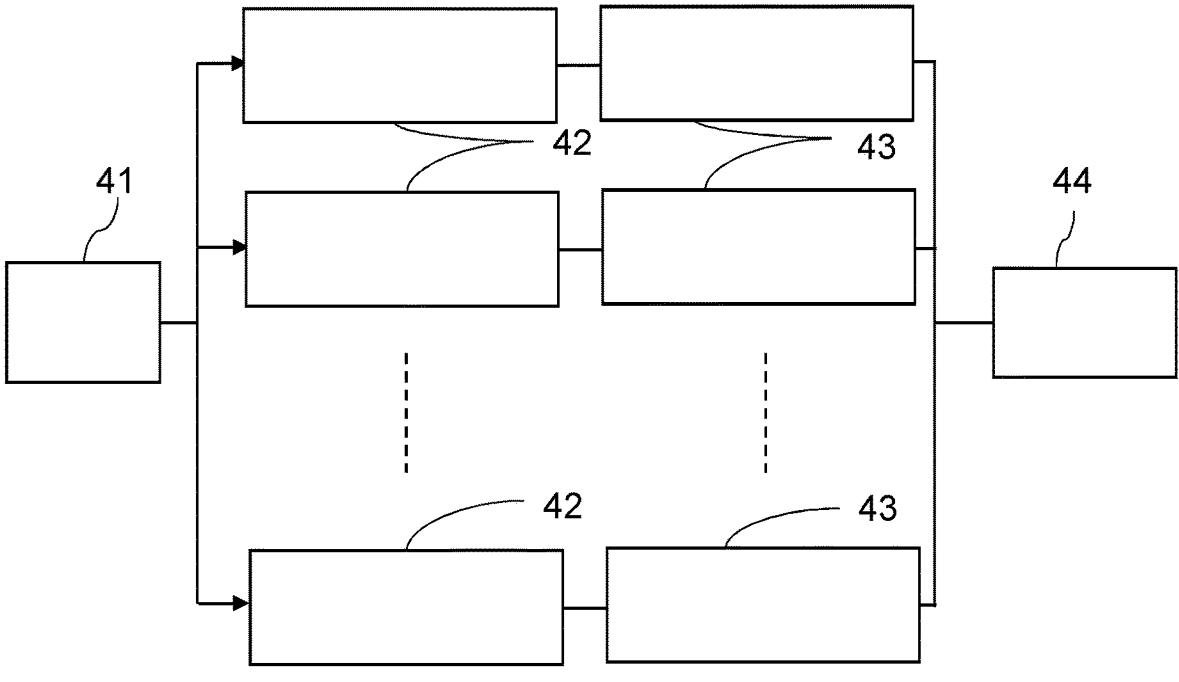
FIG. 5 illustrates, in a schematic diagram, an embodiment of a method using multiple algorithms to process sensor signal data at a backend computing device, in accordance with an embodiment of the present disclosure.

FIG. 5 illustrates, in a schematic diagram, an embodiment of a method of using multiple algorithms to process sensor data at a backend computing device. The example illustrates processing of data collected by motion detectors.

When considering features, data frame 41 is the basic data unit to be evaluated. Some representative features that may be used for an evaluation of the sensor signal data are, for example:

- arithmetic mean of respective feature values over the data frame;
- standard deviation of respective feature values over the data frame;

median in the data frame, for example by sorting respective feature values in an ascending order, and return the middle one;

- largest value in the data frame, for example by sorting respective feature values in an ascending order, and return the last one;
- signal magnitude area over the data frame, that is, sorting respective feature values in an ascending order, and return the first one;
- average sum of respective feature magnitude squares over the data frame;
- entropy of a respective feature magnitude distribution over the data frame;
- interquartile range;
- 4th order Burg autoregression coefficients;
- largest spectrum component;
- spectrum signal weighted average;
- spectrogram generated by continuous wavelet transform.

The number of data features as listed above may be processed by several standard tools, including but not limited to Support Vector Machine, SVM, Neural Network, AdaBoost (adaptive boosting), and Random Forest, for independently selecting a feature combination 42 for processing. The processing may comprise, for example, classification of features of features by a respective classification algorithms 43. Each classification algorithm 43 may provide one classification after a training stage. In the decision stage of a respective algorithm, for a same data frame, each processing algorithm outputs an "1" if it decides there is a target event, otherwise it outputs a "0", for example. Then a final decision 44 is made by weighting the votes of each classification algorithm.

The final decision 44 may be transmitted to the end device to perform a corresponding operation accordingly.

Instead of directly providing a decision, by the remote computing device, the raw sensor signal data may be pre-processed by the remote computing device and further evaluated by the local processor of the device for detecting or determining a particular event for performing an operation by the device.

That is, the local processor MCU may generate a feature profile from the pre-processed data and matches same to the set of predetermined feature profiles, as disclosed above.

It will be appreciated by those skilled in the art that the sensor signal data may be transmitted from the end device to the backend remote computing device in different manners, such that the above described processing or pre-processing of the sensor signal data may be performed.

In a first manner or mode, all raw sensor data samples are sent to the backend computing device, for example if there is no limitation on data transmission rate. The backend computing device may thus directly get the complete raw data samples without any other processing.

In a second manner or mode, the raw sensor data samples are down-sampled to form new data samples, such that the transmission of new data samples will not exceed a limitation on data transmission rate. On receiving the new data samples, the backend computing device may reconstruct the original data samples by classical signal reconstruction techniques, for example.

in a third manner or mode, if computation complexity of data compression is acceptable to an MCU, the raw data samples are compressed by the MCU to form new data samples, such the transmission of new data samples to the remote computing device will not exceed a limitation on data transmission rate. On receiving the new data samples, the backend computing device may reconstruct the original data samples by classical data decompression techniques, for example.

It is noted that an operation by the device may be directly based on the result of the matching step, i.e. step 12 in FIG. 1, or the result provided by the remote computing device, i.e. step 14, or that the operation is based on the result of an additional operation algorithm to be applied by the processor or MCU of the device on the raw sensor signal data or remotely pre-processed sensor signal data.

To save processing resources, the operation algorithm and data analysis algorithm for generating a feature profile may be combined into a single data processing algorithm.

Figure 6:
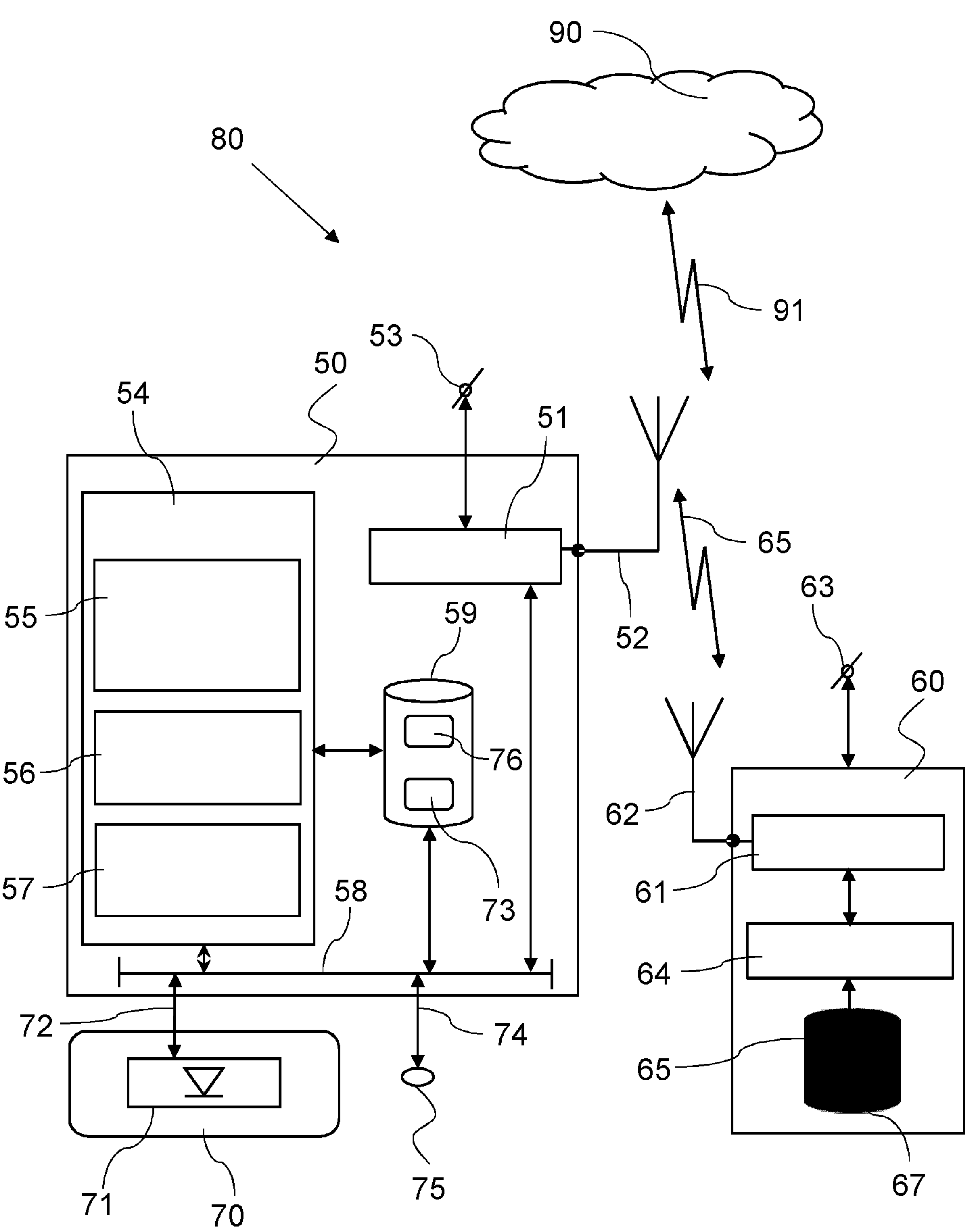
FIG. 6 illustrates, in a schematic diagram, a microwave motion detection system comprising an end or node device and a backend computing device, in accordance with an embodiment of the present disclosure.

FIG. 6 schematically illustrates a motion detection system 80 comprising an end device or network node 50 and an backend computing device or server 60. The backend computing device 60 is arranged remote from the end device 50. It will be appreciated by those skilled in the art that the motion detection system 80 may also comprise multiple end devices or network nodes and multiple backend computing devices.

The end device 50 and the backend computing device 60 comprises a transceiver, Tx/Rx, unit 51, 61 arranged for wireless 52, 62 and/or wired 53, 63 exchange of data, respectively. The end device 50 and the backend computing device 60 are operatively, communicatively, connected by the Tx/Rx units 51, 61, either directly and/or via a network 90, as indicated by double arrows 66, 91, respectively, for exchanging data, such as sensor signal data, between the end device 50 and the backend computing device 60. Communication with the end device 50 may run, for example, through an intermediate network gateway device (not shown).

The end device 50 further comprises at least one processor 54, such as a microprocessor, μP, or MCU, which operatively, communicatively interacts with and controls the transceiver 51 via an internal data communication and control bus 58.

The at least one processor 54 may comprise a feature profile generation module 55, configured for generating a feature profile, such as a frequency or spectrum feature profile, from sensor signal data collected 74 by at least one sensor 75 and stored 73 in a local data storage 59, which sensor may be part of or externally operatively connected to the end device 50. The at least one processor 54 further comprises a feature profile matching module 56, such as a frequency or spectrum feature profile matching module, configured for performing adversary evaluation, based on predetermined feature profiles 76 stored in the local data storage 59 of the end device 50, so as to decide whether an operation by the end device 50 can be performed based on an evaluation of the sensor signal data by the processor 54 alone. The at least one processor 54 may optionally also comprise an operation module 57 configured for performing operation by the end device 50, either based directly on the sensor data, or based on sensor data which are processed by the remote computing device 60.

The end device 50 may be part of or operatively connected to a lighting device 70, comprising a lighting module 71, preferably a LED lighting module, operation of which is controlled by the at least one processor 54 from or through a network gateway or by a remote control device (not shown), for example.

The backend computing device 60 further comprises at least one processor 64 and storage 65, arranged for processing and storing sensor signal data received from the end device 50 by using one or more algorithms 67, such as those algorithms disclosed in connection with FIG. 4. The processing results of the remote backend computing device 60 are forwarded to the end device 50, via the Tx/Rx module 61 of the backend computing device 60.

With the lighting device 70 connected to 72 or being part of the end device 50, operation of the device 50 may comprise controlling of lighting by the lighting device, such as switching on/off, dimming, changing color of the lighting module 71, etcetera, dependent on the evaluation of the sensor signal data obtained by the sensor 75.

Specific examples are detailed below to illustrate how the method of the present disclosure is used to process sensor data such that accurate detection results may be generated.

When sensor data are received from a sensor, such as a motion detection sensor, the adversary evaluation process by the processor of the device is performed step by step as follows:

Step 1: The sensor data are sampled with a sampling rate of about 1 kHz to generate data samples. For providing data frames, a sliding window is decided to have a length of 1024 sample points, and a sliding step of 100 sample points is chosen.

Step 2: Set 100 Hz, 200 Hz and 300 Hz as background bins. For a spectrum generated from the data samples, if there are exactly three dominant peaks and they are all the on background bins, this spectrum is classified as a background spectrum. If there is only one dominant peak, and this peak lies beyond the background bins, this spectrum is classified as a motion spectrum. Any other spectrum pattern is evaluated and classified as difficult adversary.

Step 3: Perform FFT on the data samples in the sliding window, such to arrive at a 512-point spectrum.

Step 4: Find the highest magnitude value of the spectrum, let it be the largest dominant peak.

Step 5: Find other dominant peaks in the spectrum, if possible. The feature criteria are, respectively, height of a possible peak must be no less than 40% of the largest peak, a distance between two neighboring peaks is at least 10 Hz, and there is no other peak with similar height within the neighborhood of a possible peak.

Step 6: Count the number of dominant peaks, and check whether they are located at background bins.

The above described steps will be explained in connection with the evaluation of three exemplary sensor data in the following, in which both background signals and motion signals are processed. Those skilled in the art will appreciate that, for example, between Step 1 and Step 2 above, optionally the processor may perform a type of pre-processing on raw sensor signal data to remove noise, interference and artifacts to get clean data for further processing.

Figures 7, 8:
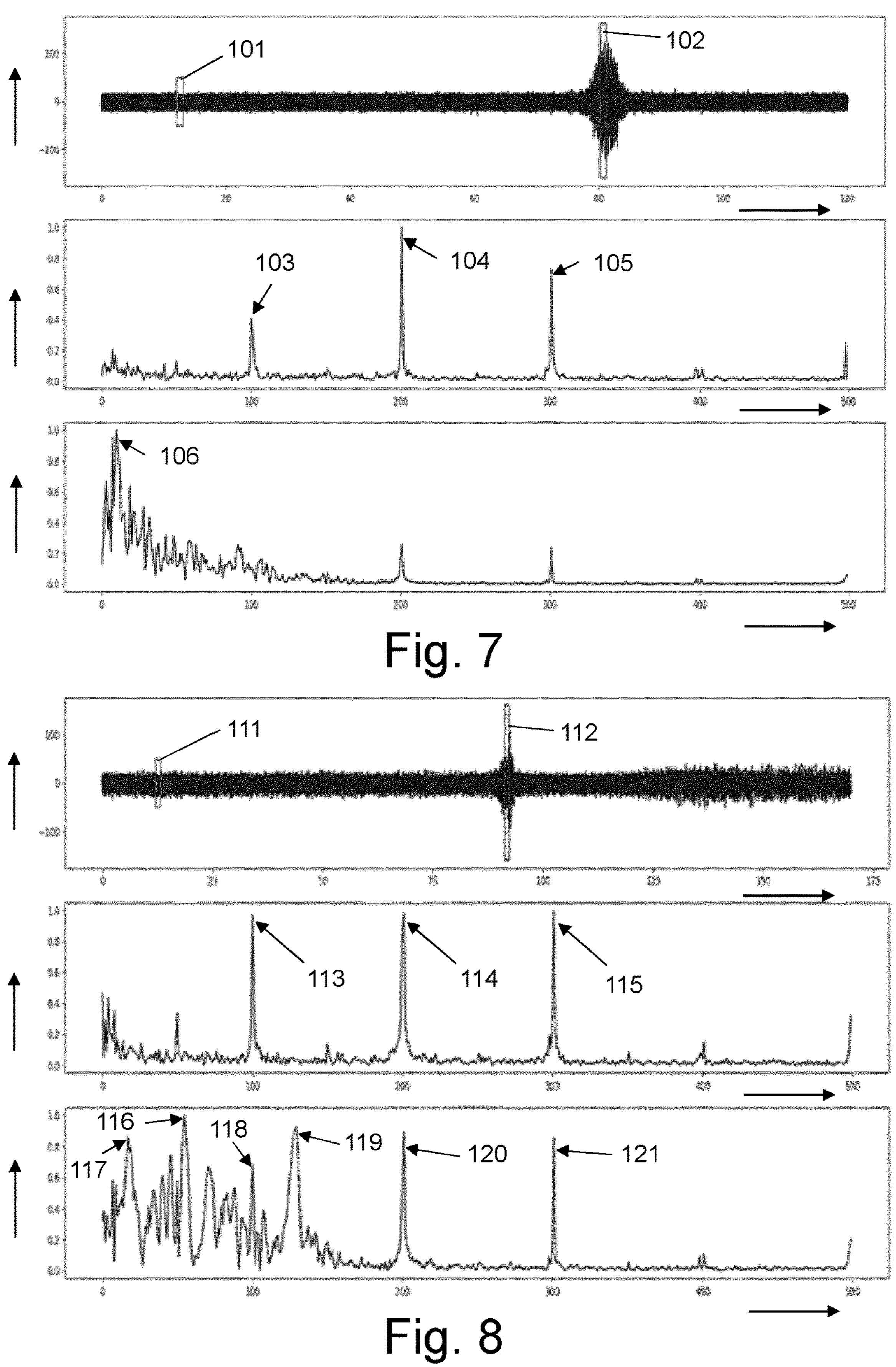
FIG. 7 illustrates, in a graphic representation, processing of motion sensor signal data representing an easy adversary, in accordance with an embodiment of the present disclosure.
FIG. 8 illustrates, in a graphic representation, processing of motion sensor signal data presenting a difficult adversary, in accordance with an embodiment of the present disclosure.
Figure 9:
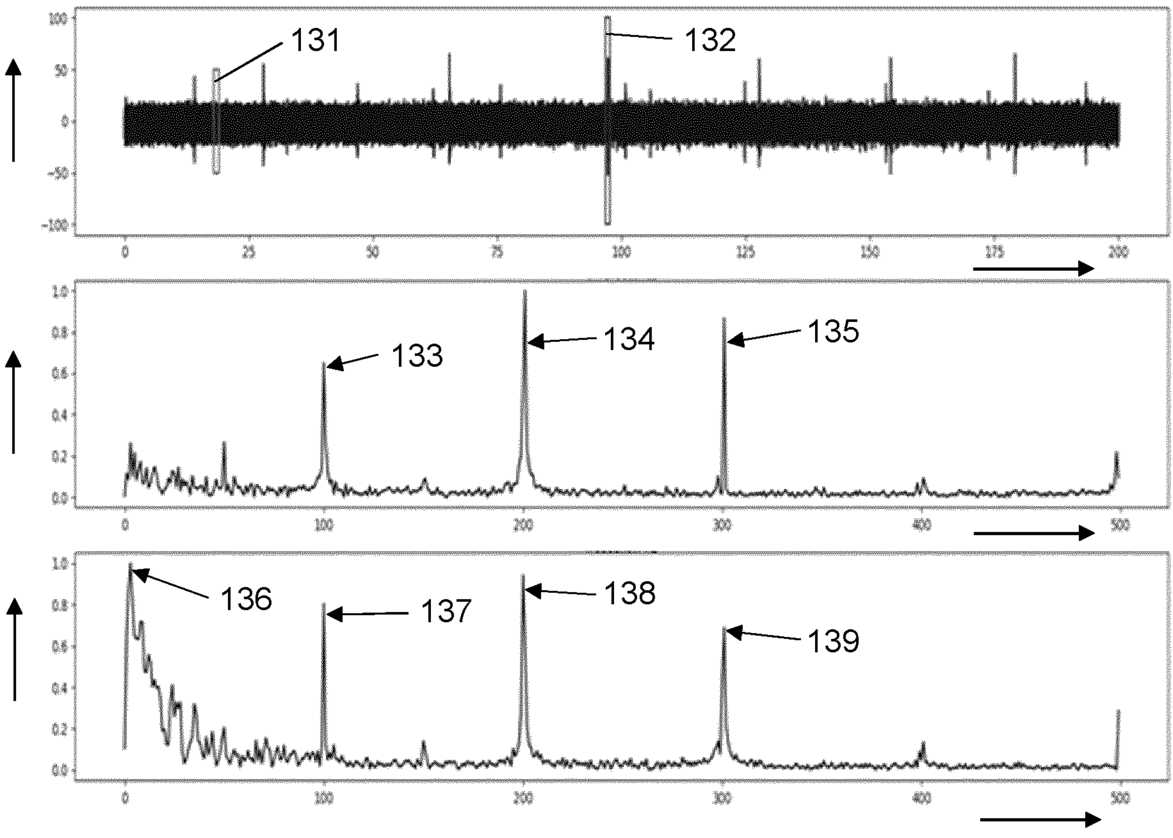
FIG. 9 illustrates, in a graphic representation, processing of motion sensor signal data presenting a type of difficult adversary, in accordance with an embodiment of the present disclosure.

FIG. 7 illustrates processing of sensor data of a motion detection sensor measured under good weather condition and representing easy adversary. FIGS. 8 and 9 illustrate processing of motion sensor data which presents difficult adversary. In all three figures, the upper plot or graph represents a piece of raw sensor signal data collected by a microwave sensor in the time domain t(s), the plot in the middle represents an FFT background spectrum in the frequency domain f (Hz), and the lower plot represents a motion frequency spectrum f (Hz). In each of the background spectrum and the motion spectrum, amplitudes M of the peaks plotted along the vertical axis are normalized to the highest peak. Along the vertical axis of the raw sensor signal data in the upper plot, arbitrary units fir the signal strength S are indicated for clarity purposes.

In FIG. 7, the raw sensor signal has a duration of about two minutes. According to the ground truth recording, the signal in box 101 is a background signal, and the signal in the box 102 is a target motion signal. The background and motion spectrums as shown in the middle and lower plots, respectively, are output by the above Step 3.

In the background spectrum shown in the middle plot, Step 4 output shows that the largest peak 104 is on 200 Hz and its height or magnitude is 1.0. Step 5 output shows that two other dominant peaks 103 and 105 are respectively on 100 Hz and 300 Hz, with heights of 0.47 and 0.77. Step 6 output shows that there are exactly three dominant peaks on background bins.

In the motion spectrum shown in the lower plot, Step 4 output shows that the largest peak 106 is on 10 Hz and its height or amplitude is 1.0. Step 5 output shows there are no other dominant peaks. Step 6 output shows that there is only one dominant peak 106, and it is not on any background bin. The scenario as illustrated in FIG. 7 therefore belongs to easy adversary.

The difficult adversary of FIG. 8 is one referring to good weather condition. The raw sensor signal collected by the microwave sensor in the upper plot has a duration of about 3 minutes. According to the ground truth recording, the signal in box 111 is a background signal, and the signal in box 112 is a motion signal. The background and motion spectrums as shown in the middle and lower plot of FIG. 8 are output by the above Step 3.

In the background spectrum shown in the middle plot, Step 4 output shows the largest peak 115 is on 300 Hz and its height or magnitude is 1.0. Step 5 output shows two other dominant peaks 113 and 114 respectively on 100 Hz and 200 Hz, with amplitudes of 0.97 and 0.98. Step 6 output shows there are exactly three dominant peaks on background bins.

In the motion spectrum as shown in lower plot, Step 4 output shows the largest peak 116 is on 55 Hz and its height is 1.0. Step 5 outputs shows that there are five other dominant peaks 117, 118, 119, 120 and 121, they are respectively on 16 Hz, 100 Hz, 128 Hz, 200 Hz and 300 Hz, their heights are respectively 0.88, 0.68, 0.93, 0.91, 0.85. Step 6 output in the lower plot shows that there are six dominant peaks, and three of them, i.e. 118, 120 and 121 are on background bins.

According to the adversary evaluation as described above, it is difficult to decide whether there is a motion target event based on the motion spectrum shown in the lower plot of FIG. 8. The sensor data therefore will need to be processed at the backend computing device or machine prior to the end device, that is the motion detector, performing an operation according to the motion detection results provided by the backend computing device.

The difficult adversary of FIG. 9 is obtained under rainy weather condition. The raw signal collected by microwave sensor shown in the upper plot has a duration of 200 seconds. According to the ground truth recording, the signal in box 131 is a background signal, and the signal in the box 132 is a rain drop signal. The background and motion spectrums as shown in the middle and lower plots of FIG. 9 are output by the above Step 3.

In the middle plot, Step 4 output shows that the largest peak 134 is on 200 Hz and its height or magnitude is 1.0. Step 5 output shows two other dominant peaks 133 and 135, respectively on 100 Hz and 300 Hz, with heights of 0.65 and 0.87. Step 6 output in the middle plot shows that there are exactly three dominant peaks on background bins.

In the lower plot, Step 4 output shows that the largest peak 136 is on 3 Hz and its height is 1.0. Step 5 output shows three other dominant peaks 137, 138 and 139, they are respectively on 100 Hz, 200 Hz and 300 Hz, their heights are respectively 0.81, 0.96, 0.71. Step 6 output in the lower plot shows that there are four dominant peaks, and three of them 137, 138, 139 are on background bins.

According to the adversary evaluation as described above, it is difficult to decide whether there is a motion event based on the spectrum shown in the lower plot. The sensor data therefore will be further processed at the backend computing device prior to the end device, that is the motion detector, performing an operation according to the motion detection results obtained from the backend computing device.

With adversary evaluation performed on each sensor data, the operation by the device may be performed while balancing accuracy, efficiency and responsiveness.

It shall be understood that an embodiment of the present disclosure can also be any combination of the dependent claims and/or the above embodiments and a respective independent claim.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or transceiver or other unit may fulfil the functions of several items recited in the claims. The mere fact that certain measures are recited in mutually different dependent claims does not indicate that a combination of these measured cannot be used to advantage. A computer program may be stored/distributed on a suitable medium such as an optical storage medium or a solid-state medium supplied together with or as a part of the hardware, but may also be distributed in other forms, such as via the Internet or other wired or wireless telecommunication systems. Any reference signs in the claims should not be construed as limiting the scope thereof.

The invention claimed is:

1. A method of performing an operation based on sensor signal data associated with a target event and obtained from at least one sensor by a device comprising a processor, said method comprising:

generating, by said processor, a feature profile from said sensor signal data;

wherein said generating comprises using a predefined data analysis algorithm, comprising a transformation algorithm; wherein said transformation algorithm is a Fast Fourier Transform algorithm, and said generated feature profile is a spectrum feature profile comprising a set of frequency components having an amplitude exceeding a predetermined threshold value, wherein said set of predetermined feature profiles comprises predetermined spectrum feature profiles defined by a number and frequency of frequency components exceeding said threshold;

matching, by said processor, said generating feature profile to a set of predetermined feature profiles to said processor; p1 determining, by said processor, whether said operation can be performed locally on said device or remotely, based on an evaluation of said sensor signal data;

performing said operation, by said device, controlled by said processor, upon detection of the target event based on local processing of said sensor signal data, if said generated feature profile matches at least one of said set of predetermined feature profiles, and performing said operation, by said device, controlled by said processor, upon detection of the target event based on remote processing of said sensor signal data, if said generated feature profile does not match at least one of said set of predetermined feature profiles, wherein said sensor signal data comprises at least one of motion data, ambient sound data, image data, video data, temperature data, humidity data, pressure data, luminance data, chemical composition or substance data, olfactive data and tactile data, and wherein performing said operation, by said device, comprises controlling lighting.

2. The method according to claim 1, wherein said matching comprises comparing said generated feature profile to a set of predetermined feature profiles available to said processor.

3. The method according to claim 1, wherein said matching comprises determining whether a generated feature profile repeats in a predetermined time period.

4. The method according to claim 1, wherein said performing said operation, by said device, using said sensor signal data comprises applying an operation algorithm to said sensor signal data, wherein said operation algorithm comprises a data analysis algorithm for generating said feature profile.

5. The method according to claim 1, wherein said device further comprises a transceiver, and said method comprises, prior to performing said operation based on said remote processing of sensor signal data;

transmitting, by said transceiver, said sensor signal data to said remote computing device, and receiving, by said transceiver, from said remote computing device, said processed sensor signal data obtained by applying at least one processing algorithm at said transmitted sensor signal data by said remote computing device.

6. The method according to claim 5, wherein transmitting said sensor signal data by said transceiver comprises transmitting a representation of said sensor signal data to said remote computing device.

7. The method according to claim 1, wherein said device comprises a lighting fixture comprising at least one lighting module, and wherein performing said operation, by said device, comprises controlling lighting by said at least one lighting module.

8. The method of claim 7, wherein the lighting module comprises an LED lighting module.

9. The method of claim 1, further comprising distinguishing between a background event and the target event based on said sensor signal data.

10. The method of claim 1, wherein said processor comprises a feature profile matching module configured to perform an adversary evaluation, wherein said adversary evaluation is configured to determine whether the operation can be performed on said device based on an evaluation of said sensor signal data by said processor.

11. A device for performing an operation based on sensor signal data associated with a target event obtained from at least one sensor, said device comprising a processor and a transceiver, wherein said processor and transceiver are arranged for performing said operation, controlled by said processor, in accordance with a method comprising generating, by said processor, a feature profile from said sensor signal data;

wherein said generating comprises using a predefined data analysis algorithm, comprising a transformation algorithm, wherein said transformation algorithm is a Fast Fourier Transform algorithm, and said generated feature profile is a spectrum feature profile comprising a set of frequency components having an amplitude exceeding a predetermined threshold value, wherein said set of predetermined feature profiles comprises predetermined spectrum feature profiles defined by a number and frequency of frequency components exceeding said threshold;

matching, by said processor, said generated feature profile to a set of predetermined feature profiles available to said processor;

determining, by said processor, whether said operation can be performed locally on said device or remotely, based on an evaluation of said sensor signal data;

performing said operation, by said device, controlled by said processor, upon detection of the target event based on local processing of said sensor signal data, if said generated feature profile matches at least one of said set of predetermined feature profiles, and performing said operation, by said device, controlled by said processor, upon detection of the target event based on remote processing of said sensor signal data, if said generated feature profile does not match at least one of said set of predetermined feature profiles, wherein said sensor signal data comprises at least one of motion data, ambient sound data, image data, video data, temperature data, humidity data, pressure data, luminance data, chemical composition or substance data, olfactive data and tactile data, and wherein performing said operation, by said device, comprises controlling lighting.

12. The device according to claim 11, further comprising at least one lighting module, wherein performing said operation by said device, controlled by said processor, comprises controlling lighting by said at least one lighting module.

13. The device of claim 12, wherein the lighting module comprises an LED lighting module.

14. A system, comprising a device according to claim 11 and a remote backend computing device, wherein said remote backend computing device is arranged for:

receiving sensor signal data from said device;

processing received sensor signal data by applying at least one processing algorithm, and p1 transmitting said processed sensor signal data to said device.

15. The device of claim 11, wherein said device further comprises the at least one sensor.

16. The device of claim 11, wherein the at least one sensor comprises a motion detector and wherein said sensor signal data comprises motion data.

17. The device of claim 11, wherein the method further comprises distinguishing between a background event and the target event based on said sensor signal data.

18. The device of claim 11, wherein the method further comprises determining whether a generated feature profile repeats in a predetermined time period.

19. The device of claim 11, wherein said processor comprises a feature profile matching module configured to perform an adversary evaluation, wherein said adversary evaluation is configured to determine whether the operation can be performed on said device based on an evaluation of said sensor signal data by said processor.

20. A computer program product comprising program code stored on a non-transitory computer readable medium, said program code arranged for performing a method of performing an operation based on sensor signal data associated with a target event and obtained from at least one sensor by a device comprising a processor, said method comprising:

generating, by said processor, a feature profile from said sensor signal data;

wherein said generating comprises using a predefined data analysis algorithm, comprising a transformation algorithm, wherein said transformation algorithm is a Fast Fourier Transform algorithm, and said generated feature profile is a spectrum feature profile comprising a set of frequency components having an amplitude exceeding a predetermined threshold value, wherein said set of predetermined feature profiles comprises predetermined spectrum feature profiles defined by a number and frequency of frequency components exceeding said threshold;

matching, by said processor, said generated feature profile to a set of predetermined feature profiles available to said processor;

determining, by said processor, whether said operation can be performed locally on said device or remotely, based on an evaluation of said sensor signal data;

performing said operation, by said device, controlled by said processor, upon detection of the target event based on local processing of said sensor signal data, if said generated feature profile matches at least one of said set of predetermined feature profiles; and performing said operation, by said device, controlled by said processor, upon detection of the target event based on remote processing of said sensor signal data, if said generated feature profile does not match at least one of said set of predetermined feature profiles, wherein said sensor signal data comprises at least one of motion data, ambient sound data, image data, video data, temperature data, humidity data, pressure data, luminance data, chemical composition or substance data, olfactive data and tactile data, wherein said program code is executed by at least one processor, and wherein performing said operation, by said device, comprises controlling lighting.

21. The computer program product of claim 20, wherein said processor further comprises a feature profile matching module configured to perform an adversary evaluation, wherein said adversary evaluation is configured to determine whether the operation can be performed on said device locally based on an evaluation of said sensor signal data by said processor.

* * * * *